United States Patent [19]
Ishikawa

[11] Patent Number: 6,021,225
[45] Date of Patent: Feb. 1, 2000

[54] IMAGE PROCESSING APPARATUS

[75] Inventor: Hiroyuki Ishikawa, Tokyo, Japan

[73] Assignee: NEC Corporation, Tokyo, Japan

[21] Appl. No.: 08/943,410

[22] Filed: Sep. 30, 1997

[30] Foreign Application Priority Data

Oct. 3, 1996 [JP] Japan .................................. 8-263225

[51] Int. Cl.[7] .............................. G06K 9/36; G06F 15/00
[52] U.S. Cl. ...................... 382/232; 395/800.01; 345/501
[58] Field of Search .................................... 382/232, 236, 382/239, 250, 251; 395/200.34, 500, 800.01; 345/501; 348/396

[56] References Cited

U.S. PATENT DOCUMENTS 5,600,844  2/1997  Shaw et al. ............................. 395/800
5,634,058  5/1997  Allen et al. ............................. 385/712

FOREIGN PATENT DOCUMENTS 3-244067  10/1991  Japan .............................. G06F 15/16
4-322329  11/1992  Japan ................................ G06F 9/45
6-282444  10/1994  Japan ................................ G06F 9/45

Primary Examiner—Thomas D. Lee
Assistant Examiner—Wenpeng Chen
Attorney, Agent, or Firm—Foley & Lardner

[57] ABSTRACT

An image processing apparatus includes an image processing section, a module table, a module storage section, and a program generation section. The image processing section compresses/encodes an image by using an intraframe code obtained by dividing an image into small blocks, performing orthogonal transform for each block, quantizing the transform result, and performing high-efficiency encoding the quantized result, and an interframe code obtained by performing motion search by searing for blocks of previous and subsequent frames such that the differences between the blocks and divided blocks of a current frame become minimum, calculating the differences between the blocks of the current frame and the blocks of the frames having undergone the motion search, performing orthogonal transform for the difference blocks, quantizing the transform result, and performing high-efficiency encoding for the quantized result. The module table is used to designate modules required to constitute an optimal image processing program for each type of CPU. The module storage section stores a plurality of modules designated by the module table. The program generation section generates an optimal image processing program for a CPU in use by loading designated modules from the module storage means with reference to the module table.

5 Claims, 19 Drawing Sheets

FIG. 1A PRIOR ART ONE OR MORE GOPS
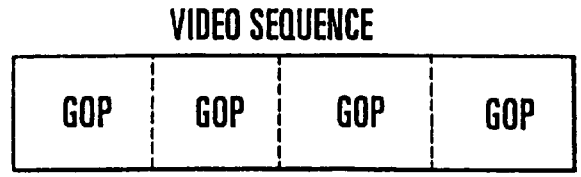
FIG. 1B PRIOR ART ONE OR MORE PICTURES
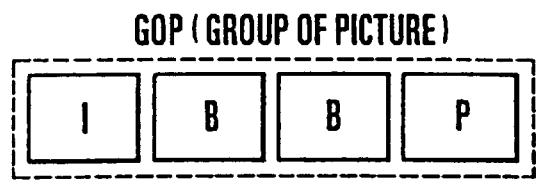
FIG. 1C PRIOR ART ONE OR MORE SLICES
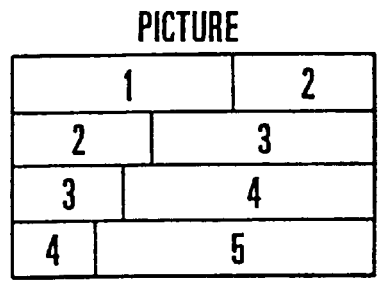
FIG. 1D PRIOR ART ONE OR MORE MACROBLOCKS
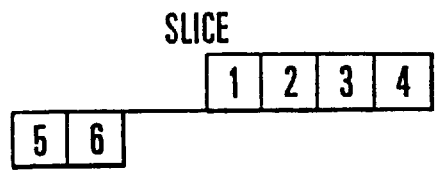
FIG. 1E PRIOR ART SIX BLOCKS
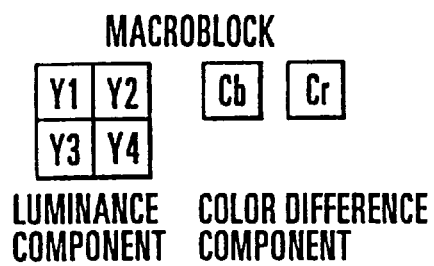
FIG. 1F PRIOR ART 8×8 PIXELS

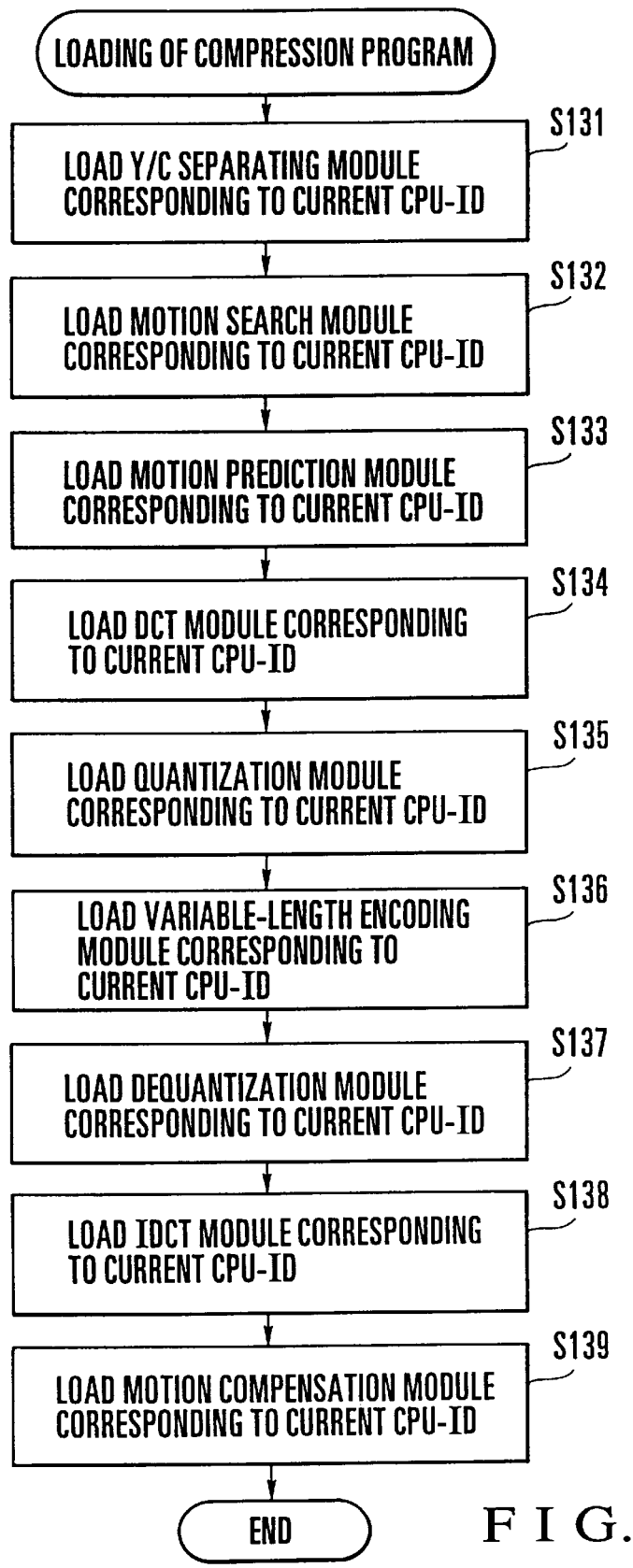
F I G. 9

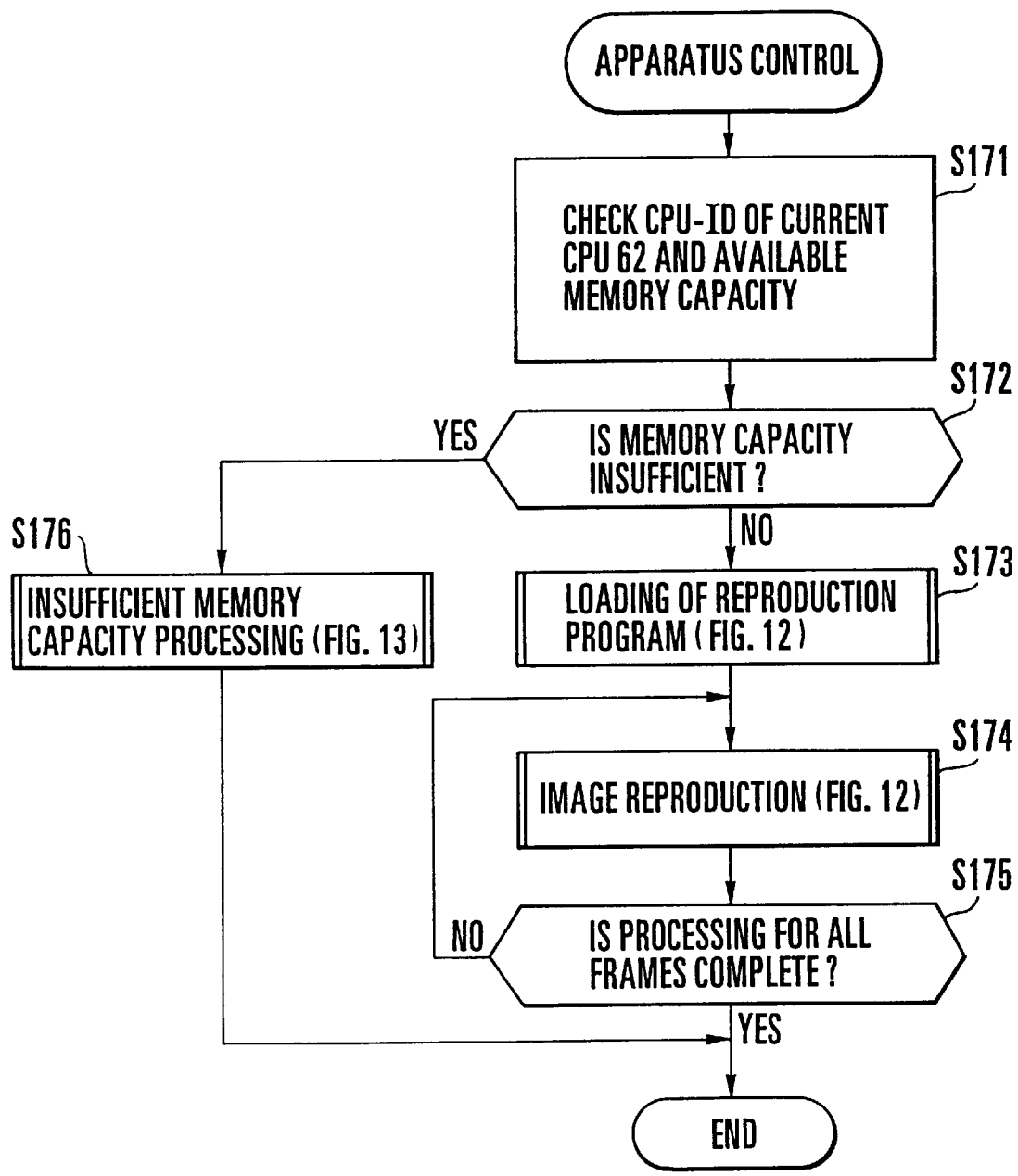
F I G. 11

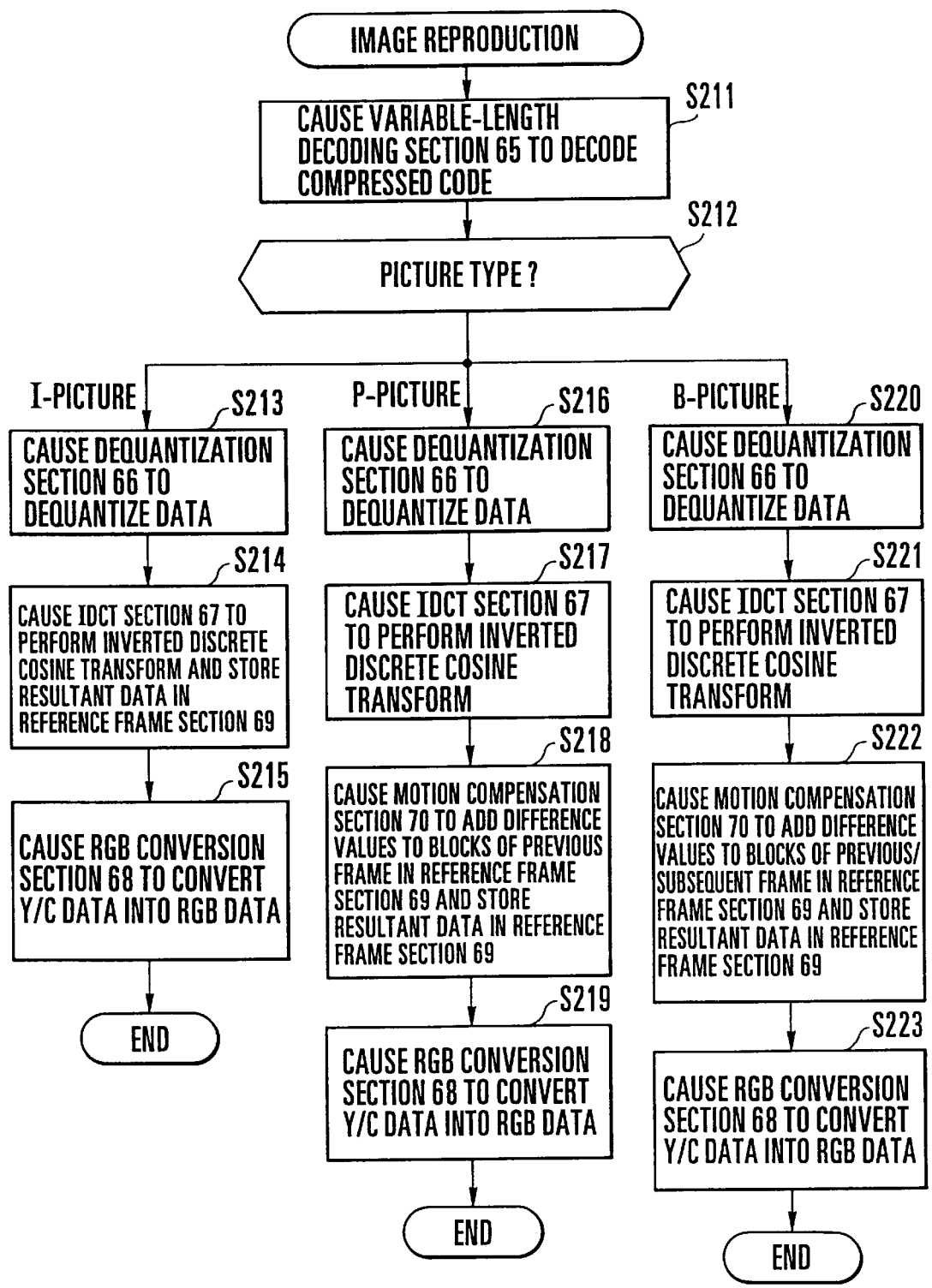
F I G. 14

| QUANTIZATION MODULE FOR 32-BIT CPU | | | QUANTIZATION MODULE FOR 16-BIT CPU | | |
|---|---|---|---|---|---|
| LINE NUMBER | | PROGRAM CODE | LINE NUMBER | | PROGRAM CODE |
| 0020 | | add eax, edx | 0020 | | add ax, dx |
| 0021 | | shl edx, 1 | 0021 | | shl dx, 1 |
| 0022 | | test ecx, 1 | 0022 | | test cx, 1 |
| 0023 | | jnz ef | 0023 | | jnz ef |
| 0024 | | add eax, edx | 0024 | | add eax, edx |
| 0025 | 00: | jnul ecx, edx | 0025 | 00: | push ax |
| 0026 | | shl ecx, 1 | 0026 | | mov cx, ax |
| 0027 | | mov edx, 0 | 0027 | | imul dx |
| 0028 | | idiv ecx | 0028 | | mov cx, ax |
| | | | 0029 | | shl cx, 1 |
| | | | 0030 | | pop ax |
| | | | 0031 | | mov dx, 0 |
| | | | 0032 | | Idlv cx |

F I G. 15 A

F I G. 15 B

| STANDARD MODULE | | MODULE FOR HIGH-PRECISION CALCULATION | |
|---|---|---|---|
| LINE NUMBER | PROGRAM CODE | LINE NUMBER | PROGRAM CODE |
| 0020 | mov eax, 18 | 0020 | mov eax, 18 |
| 0021 | mov ecx, 5 | 0021 | mov ecx, 5 |
| 0022 | div ecx | 0022 | shl eax, 4 |
| 0023 | mov edx, eax | 0023 | div ecx |
| 0024 | mov eax, 8 | 0024 | mov ebx, eax |
| 0025 | mov ecx, 3 | 0025 | mov eax, 8 |
| 0026 | div ecx | 0026 | mov ecx, 3 |
| 0027 | add ebx, eax | 0027 | shl eax, 4 |
| | | 0028 | div ecx |
| | | 0029 | add ebx, eax |
| | | 0030 | shr ebx, 4 |

IMAGE PROCESSING APPARATUS

BACKGROUND OF THE INVENTION

The present invention relates to an apparatus for compressing/encoding an image code by using a CPU (Central Processing Unit), a DSP (Digital Signal Processor), and the like, and an apparatus for reproducing a compressed image code.

When an image is to be digitized and recorded on a recording medium such as a CD-ROM (Compact Disk-Read Only Memory) or a hard disk, the data amount becomes enormous. For this reason, the image data is generally compressed/encoded to be recorded. Of various types of compressing/encoding schemes, an encoding scheme based on DCT (Discrete Cosine Transform) and designed to compress an image by using its property of having spatial frequencies concentrated at low frequencies is relatively popular. This scheme is used for encoding schemes as international standards such as JPEG (Joint Photographic Experts Group) and MPEG (Moving Picture Experts Group).

FIGS. 1A to 1F show the hierarchical structure of a code format complying with MPEG. An MPEG code has several hierarchical layers as shown in FIGS. 1A to 1F. The uppermost layer is a video sequence, which is constituted by a plurality of GOPs (Group of Picture), as shown in FIG. 1A.

A GOP is constituted by a plurality of pictures. One picture represents one image. As shown in FIG. 1B, there are three types of pictures, i.e., an I-picture which is an intraframe code, a P-picture which is an interframe code based on only forward prediction, and a B-picture which is an interframe code based on bidirectional prediction. As shown in FIG. 1C, a picture is constituted by a plurality of slices obtained by dividing a picture into arbitrary areas. As shown in FIG. 1D, a slice is constituted by a plurality of macroblocks arranged from left to right or from top to bottom.

As shown in FIG. 1E, a macroblock is constituted by six blocks, i.e., luminance components (Y1, Y2, Y3, and Y4) which are blocks obtained by dividing 16×16-dot blocks into 8×8-dot blocks, and color difference components (Cb and Cr) which are 8×8-dot blocks in the area which coincides with the luminance components. The 8×8-dot block in FIG. 1F is the minimum encoding unit.

Compression of an image code by the conventional encoding scheme based on DCT will be described below by taking MPEG as an example. FIG. 2 shows a conventional image compressing apparatus which complies with MPEG. This apparatus is constituted by an apparatus control section 1, a CPU 2, a keyboard 3, and an image compression section 4. In the image compression section 4, a Y/C (luminance and chrominance) separating section 5 converts loaded image data into Y/C data, and a motion search section 6 searches for the motion of the image in the previous/subsequent frame and the current frame in units of 8×8-block areas. According to MPEG, since a GOP is divided into three types of pictures, i.e., an I-picture which is an intraframe code, a P-picture which is an interframe code based on only forward direction, and a B-picture which is an interframe code based on bidirectional prediction, three types of encoding are performed.

When an I-picture is to be processed, a DCT section 8 performs discrete cosine transform for the values of the pixels in an 8×8-block area of the current frame. A quantization section 9 then quantizes the resultant data. A variable-length encoding section 10 performs high-efficiency compression for the quantized data to generate a variable-length Huffman code. To decode the compressed image into a reference frame, a dequantization section 14 dequantizes the quantized data. An IDCT section 13 then performs inverted discrete cosine transform for the dequantized data to calculate the pixel values, and stores them in a reference frame section 11.

When a P-picture is to be processed, a motion prediction section 7 calculates the differences between the values of the pixels in an 8×8-block area of the current frame and the values of the pixels in an 8×8-block area of the previous frame which is stored in the reference frame section 11 and is referred to with the motion searched out by the motion search section 6. The DCT section 8 performs discrete cosine transform for the calculated difference values. The quantization section 9 then quantizes the resultant data. The variable-length encoding section, 10 performs high-efficiency compression for the quantized data to generate a variable-length Huffman code. To decode the compressed image into a reference frame, the dequantization section 14 dequantizes the quantized data, and the IDCT section 13 performs inverted discrete cosine transform to calculate the difference values. Subsequently, a motion compensation section 12 adds the difference values to the values of the pixels in the 8×8-block area of the previous frame which is stored in the reference frame section 11 and referred to by the motion prediction section 7, and stores the resultant data in the reference frame section 11.

When a B-picture is to be processed, the motion prediction section 7 calculates the differences between the values of the pixels in an 8×8-block area of the current frame and the values of the pixels in an 8×8-block area of the previous/subsequent frame which is stored in the reference frame section 11 and referred to with the motion searched out by the motion search section 6. The DCT section 8 performs discrete cosine 5 transform for the calculated difference values. The quantization section 9 then quantizes the resultant data. The variable-length encoding section 10 performs high-efficiency compression for the quantized data to generate a variable-length Huffman code. Since no B-picture is used as a reference frame, no image expansion is performed.

Reproduction of an image code by a conventional encoding scheme based on DCT will be described below with reference to FIG. 3 by taking MPEG as an example. FIG. 3 shows a conventional image reproducing apparatus for reproducing an image code complying with MPEG. Reference numeral 21 denotes an apparatus control section; 22, a CPU; 23, a keyboard; and 24, an image reproducing section. The image reproducing section 24 loads encoded data, and expands three types of codes, i.e., an I-picture which is an intraframe code, a P-picture which is an interframe code based on only forward direction, and a B-picture which is an interframe code based on bidirectional prediction.

When an I-picture is to be processed, a variable-length decoding section 25 decodes the encoded data. A dequantization section 26 dequantizes the data. An IDCT (Inverted DCT) 27 then performs inverted discrete cosine transform for the dequantized data to calculate the values of the pixels in the blocks from the output from the dequantization section 26. An RGB (Red, Green, Blue) conversion section 28 outputs the resultant image.

When a P-picture is to be processed, the variable-length decoding section 25 decodes the encoded data. The dequantization section 26 dequantizes the data. The IDCT 27 then performs inverted discrete cosine transform for the dequantized data to calculate the differences between the blocks from the output from the dequantization section 26. A motion compensation section 30 adds the calculated differences to the motion-compensated blocks of the previous frame stored in a reference frame section 29. The RGB conversion section 28 outputs the resultant image.

When a B-picture is to be processed, the variable-length decoding section 25 decodes the encoded data. The dequantization section 26 dequantizes the data. The IDCT 27 performs inverted discrete cosine transform for the dequantized data to calculate the differences between blocks from the output from the dequantization section 26. The motion compensation section 30 adds the calculated differences to the motion-compensated blocks of the previous frame stored in the reference frame section 29 and the motion-compensated blocks of the previous/subsequent frame stored in the reference frame section 29. The RGB conversion section 28 outputs the resultant image.

When compression and reproduction are performed on the basis of MPEG as an international standard, an image can be compressed and reproduced with high efficiency. Many computations are, however, required for processing such as motion search/motion compensation and DCT/IDCT. For this reason, image compression and reproduction by means of software must be processed by a program optimized to realize the est operation speed in consideration of the characteristics of a CPU. To cope with various types of CPUS, therefore, different programs must be prepared to be switched in accordance with the types of CPUS.

As a conventional method of using optimal programs, a method of compiling programs to generate optimal programs for CPUs is disclosed in Japanese Patent Laid-Open No. 6-282444. In addition, Japanese Patent Laid-Open No. 4-322329 discloses a method of generating an optimal program when the program is installed in a computer. Japanese Patent Laid-Open No. 3-244067 also discloses a method of selecting an optimal CPU in accordance with a program.

According to the above conventional scheme of generating optimal programs, however, a dedicated program must be generated for each computer to be used, and must be installed therein. Such a program cannot be shared among a plurality of computers through a network or the like. In addition, since such a program is not generated in consideration of an available memory capacity, the program may be too large in size to be loaded into the memory. Furthermore, the scheme of selecting an optimal CPU cannot be applied to a computer using a single CPU.

SUMMARY OF THE INVENTION

It is an object of the present invention to provide an image processing apparatus which can run an optimal program for a current CPU and memory in a program running operation.

In order to achieve the above object, according to the present invention, there is provided an image processing apparatus comprising image processing means, constituted by a CPU including a DSP, for compressing/encoding an image by using an intraframe code obtained by dividing an image into small blocks, performing orthogonal transform for each block, quantizing the transform result, and performing high-efficiency encoding the quantized result, and an interframe code obtained by performing motion search by searing for blocks of previous and subsequent frames such that differences between the blocks and divided blocks of a current frame become minimum, calculating the differences between the blocks of the current frame and the blocks of the frames having undergone the motion search, performing orthogonal transform for the difference blocks, quantizing the transform result, and performing high-efficiency encoding for the quantized result, a module table for designating modules required to constitute an optimal image processing program for each type of CPU, module storage means for storing a plurality of modules designated by the module table, and program generation means for generating an optimal image processing program for a CPU in use by loading designated modules from the module storage means with reference to the module table.

BRIEF DESCRIPTION OF THE DRAWINGS

FIGS. 1A to 1F are views showing the hierarchical structure of a code format complying with the MPEG scheme;

FIG. 9 is a flow chart for explaining compression program generation processing in FIG. 7;

FIG. 11 is a flow chart for explaining the control operation of the apparatus control section of the image reproducing apparatus in FIG. 5;

FIG. 14 is a flow chart for explaining the image reproduction processing in FIG. 11;

FIGS. 15A and 15B are views showing quantization program modules in the present invention;

DESCRIPTION OF THE PREFERRED EMBODIMENT

The present invention will be described in detail below with reference to the accompanying drawings.

Figure 2:
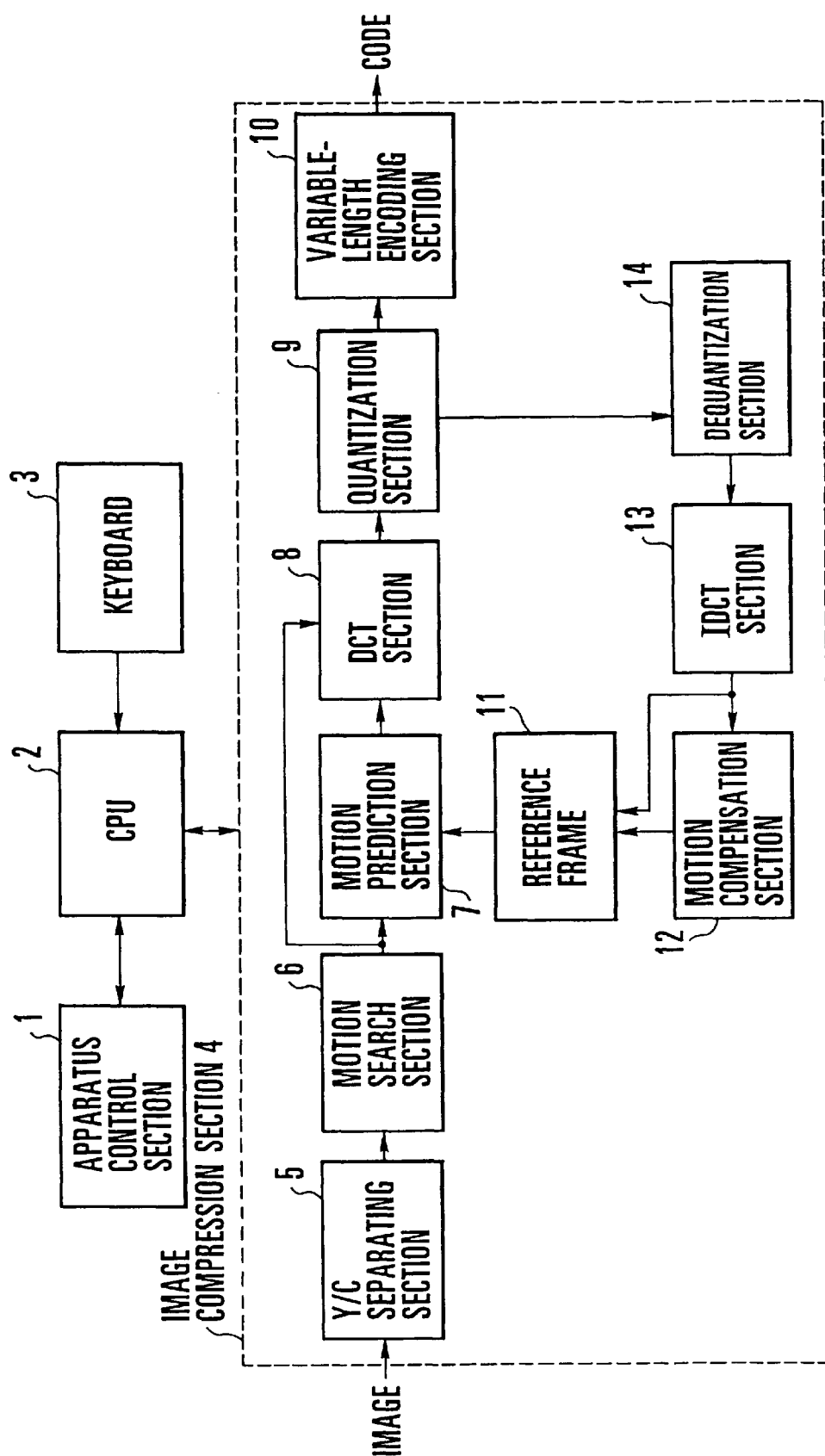
FIG. 2 is a block diagram showing a conventional image compressing apparatus.
Figure 3:
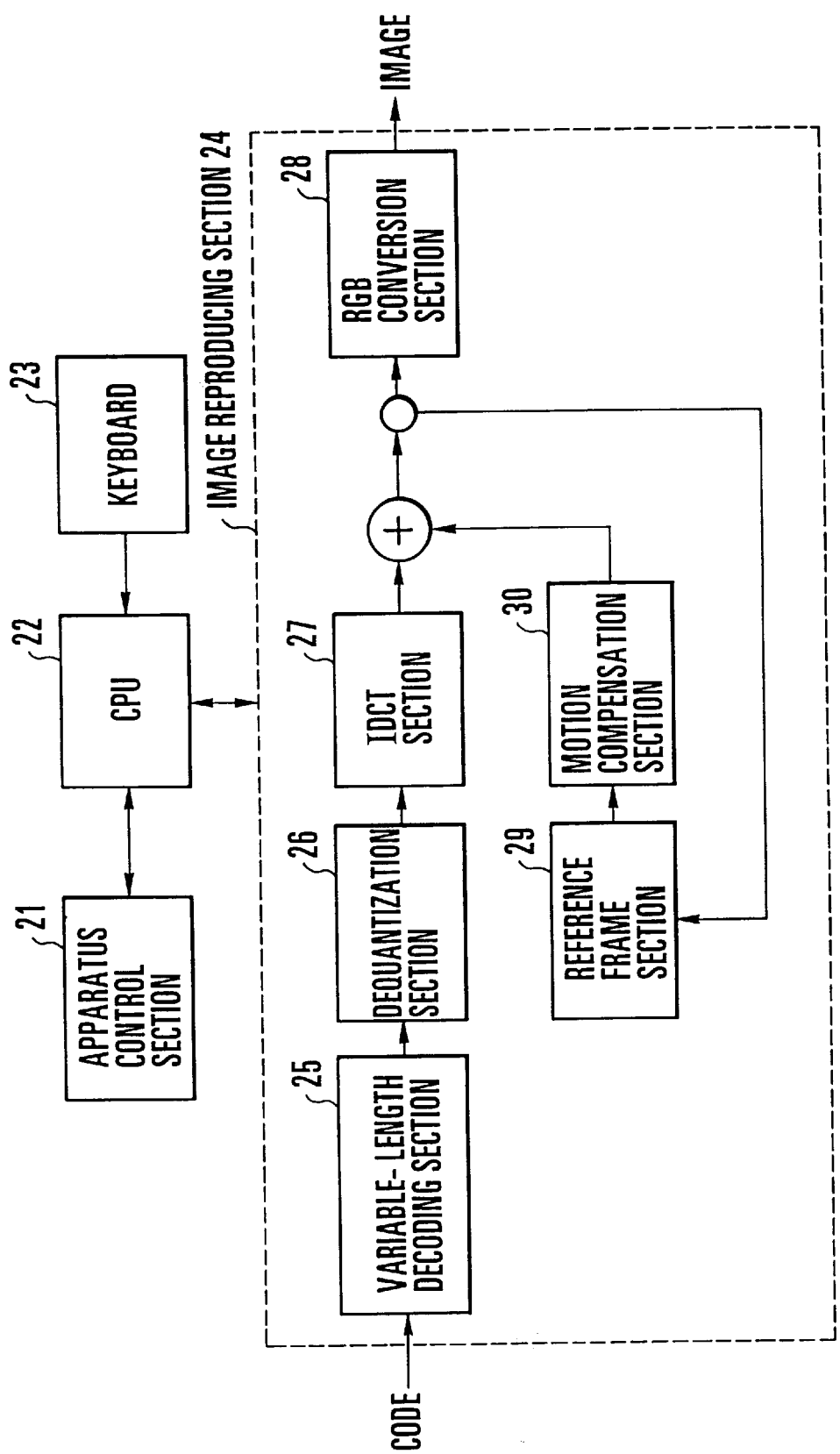
FIG. 3 is a block diagram showing a conventional image reproducing apparatus.
Figure 4:
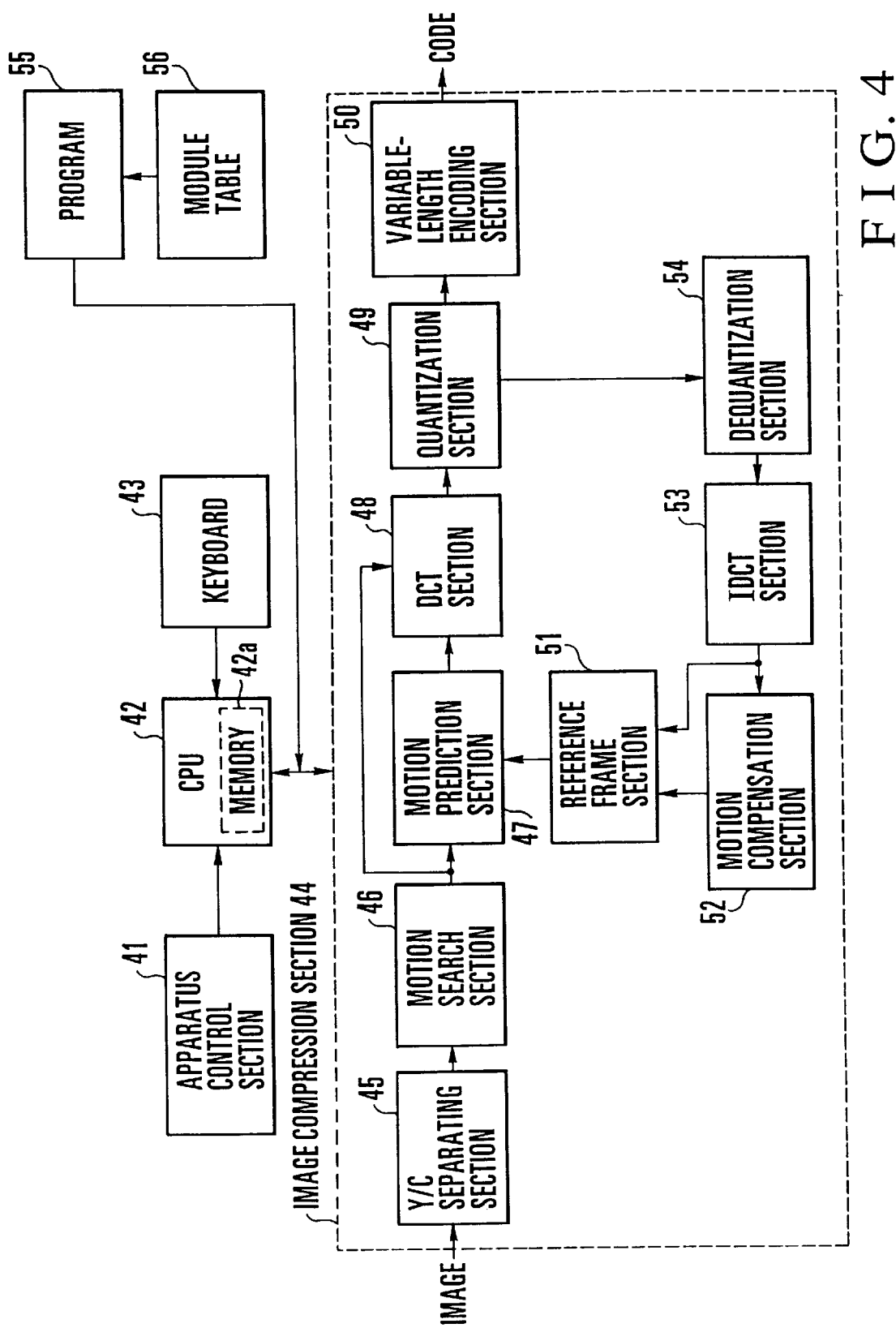
FIG. 4 is a block diagram showing an image compressing apparatus according to an embodiment of the present invention.

FIG. 4 shows an image compression apparatus according to an embodiment of the present invention. The image compression apparatus in FIG. 4 includes an apparatus control section 41 for controlling the overall apparatus, a CPU 42 for operating the program loaded into a memory 42a, a keyboard 43 for transferring an input from a user, an image compression section 44 for performing image compression in accordance with the operation performed by the CPU 42, a program 55 storing the optimal modules for each CPU, and a module table 56 indicating the respective CPUs and the corresponding optimal modules.

The image compression section 44 includes a Y/C separating section 45 for converting image data into Y/C data, a motion search section 46 for searching for the motion of an image, a motion prediction section 47 for calculating a difference between blocks from the motion of an image, a DCT section 48 for performing discrete cosine transform for the value of a block, a quantization section 49 for quantizing the value having undergone discrete cosine transform, a variable-length encoding section 50 for encoding the value into a Huffman code, a dequantization section 54 for dequantizing the quantized value, an IDCT section 53 for performing inverted discrete cosine transform for the dequantized value, a motion compensation section 52 for adding a difference value to a block in a motion-compensated reference frame, and a reference frame section 51 for storing previous and subsequent reference frames.

In the image compression apparatus in FIG. 4, when image data is loaded, the Y/C separating section 45 of the image compression section 44 converts the data into Y/C data. The motion search section 46 then searches for the motion of an image in the current frame and the previous/subsequent frames in units of 8×8-block areas. According to MPEG, each GOP is separated into three types of pictures, i.e., an I-picture which is an intraframe code, a P-picture which is an interframe code based on only forward prediction, and a B-picture which is an interframe code based on bidirectional prediction. Three types of compression are therefore performed.

When an I-picture is to be processed, the DCT section 48 performs discrete cosine transform for the values of the pixels in an 8×8-block area of the current frame, and the quantization section 49 quantizes the resultant values. The variable-length encoding section 50 then performs high-efficiency compression for the quantized values to generate a variable-length Huffman code. To decode the compressed image data into a reference frame, the quantized data is dequantized by the dequantization section 54, and then subjected to inverted discrete cosine transform by the IDCT section 53 to calculate pixel values. The pixel values are stored in the reference frame section 51.

When a P-picture is to be processed, the motion prediction section 47 calculates the differences between the values of the pixels in an 8×8-block area of the current frame and the values of the pixels in a corresponding 8×8-block area of the previous frame stored in the reference frame section 51 which is referred to with the motion searched out by the motion search section 46. The DCT section 48 performs discrete cosine transform for the calculated difference values. The quantization section 49 then quantizes the resultant values. The variable-length encoding section 50 performs high-efficiency compression for the quantized values to generate a variable-length Huffman code. To decode the compressed image into a reference frame, the quantized data is dequantized by the dequantization section 54, and then subjected to inverted discrete cosine transform in the IDCT section 53 to calculate difference values. The motion compensation section 52 adds the calculated difference values to the values of the pixels in the 8×8-block area of the previous frame which is stored in the reference frame section 51 and referred to by the motion prediction section 47, and stores the resultant data in the reference frame section 51.

When a B-picture is to be processed, the motion prediction section 47 calculates the differences between the values of the pixels in an 8×8-block area of the current frame and the values of the pixels in a corresponding 8×8-block area of each of the previous and subsequent frames which are stored in the reference frame section 51 and referred to with the motion searched out by the motion search section 46. The DCT section 48 performs discrete cosine transform for the difference values. The quantization section 49 quantizes the resultant values. The variable-length encoding section 50 then performs high-efficiency compression for the quantized values to generate a Huffman code. Since no B-picture is to be used as a reference frame, the procedure for generating a reference frame in the reference frame section 51 by using the dequantization section 54 and the subsequent sections is not executed.

The apparatus control section 41 checks the current CPU 42 to obtain the modules required to generate the optimal program for the CPU 42 from the module table 56. The apparatus control section 41 then combines the optimal modules to generate the optimal program.

Figure 5:
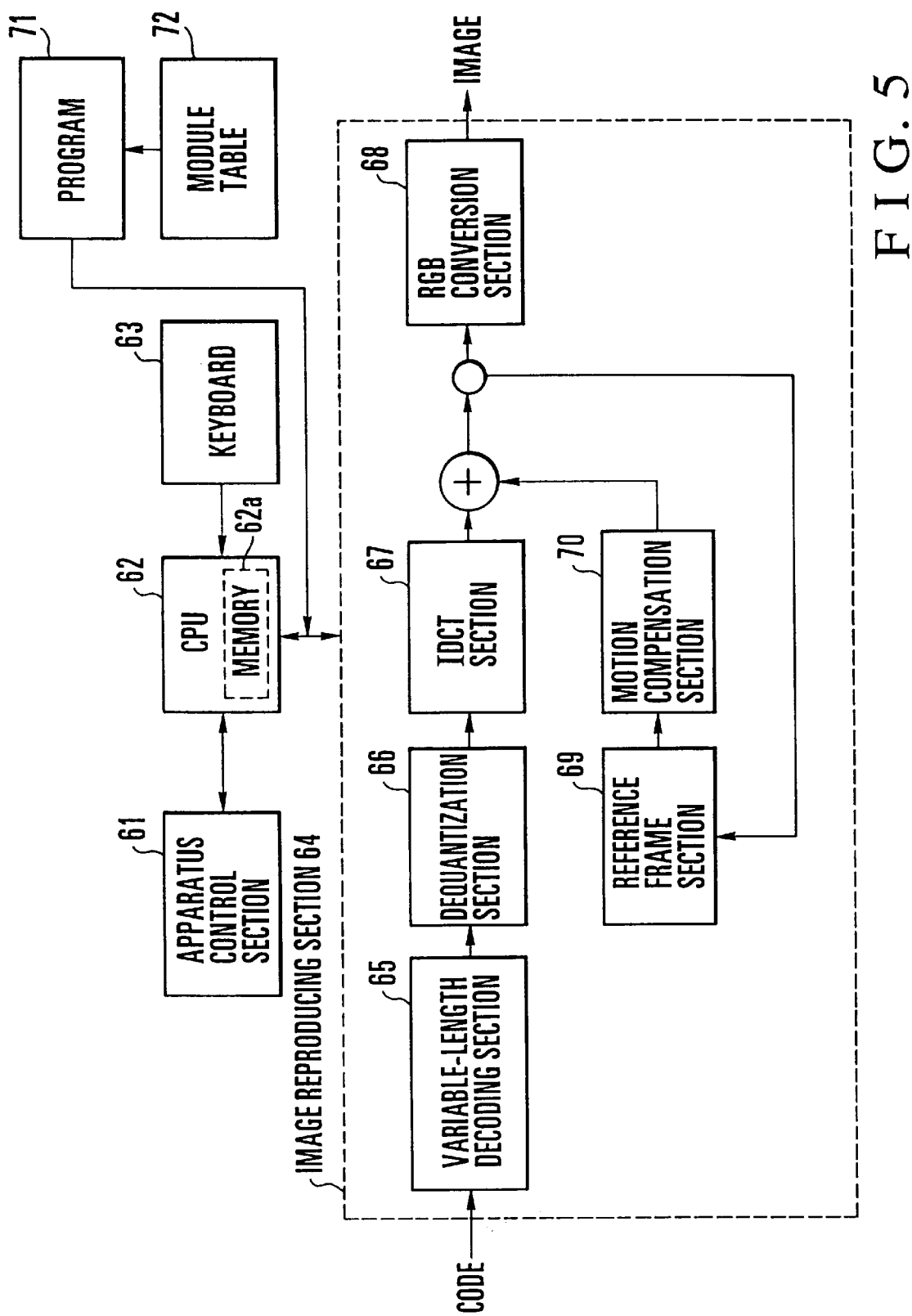
FIG. 5 is a block diagram showing an image reproducing apparatus according to an embodiment of the present invention.

FIG. 5 shows an image reproducing apparatus according to an embodiment of the present invention. The image reproducing apparatus in FIG. 5 includes an apparatus control section 61 for controlling the overall apparatus, a CPU 62 for operating the program loaded into a memory 62a, a keyboard 63 for transferring an input from the user, an image reproducing section 64 for performing image reproduction in accordance with the operation performed by the CPU 62, a program 71 storing the optimal modules for each CPU, and a module table 72 indicating the respective CPUs and the corresponding optimal modules.

The image reproducing section 64 includes a variable-length decoding section 65 for decoding a compressed code, a dequantization section 66 for dequantizing the decoded value, an IDCT section 67 for performing inverted discrete cosine transform for the dequantized value, an RGB conversion section 68 for converting Y/C data into RGB data, a reference frame section 69 for storing previous and subsequent reference frames, and a motion compensation section 70 for calculating the differences between blocks on the basis of the motion of an image.

The image reproducing apparatus in FIG. 5 loads encoded data, and expands the code into three types of codes, i.e., an I-picture which is an intraframe code, a P-picture which is an interframe code based on only forward prediction, and a B-picture based on bidirectional prediction.

When an I-picture is to be processed, the able-length decoding section 65 decodes encoded data, and the dequantization section 66 then dequantizes the decoded data. The IDCT section 67 performs inverted discrete cosine transform for the output from the dequantization section 66 to calculate the values of the pixels in the blocks. The RGB conversion section 68 outputs the resultant image.

When a P-picture is to be processed, the variable-length decoding section 65 decodes encoded data, and the dequantization section 66 then dequantizes the decoded data. The IDCT section 67 performs inverted discrete cosine transform for the output from the dequantization section 66 to calculate the differences between the blocks. The motion compensation section 70 adds the differences to the motion-compensated blocks of the the previous frame stored in the reference frame section 69. The RGB conversion section 68 outputs the resultant image.

When a B-picture is to be processed, the variable-length decoding section 65 decodes encoded data, and the dequantization section 66 then dequantizes the decoded data. The IDCT section 67 performs inverted discrete cosine transform for the output from the dequantization section 66 to calculate the differences between the blocks. Thereafter, the motion compensation section 70 adds the differences to the motion-compensated blocks of the previous frame stored in the reference frame section 69 and the motion-compensated blocks of the previous/subsequent frames stored in the reference frame section 69. The RGB conversion section 68 outputs the resultant image.

The apparatus control section 61 checks the current CPU 62 to obtain the modules required to constitute the optimal program from a module table 72, and combines the optimal modules to generate the optimal program.

The generation of an optimal program will be described next by taking image reproduction as an example.

Figure 6:
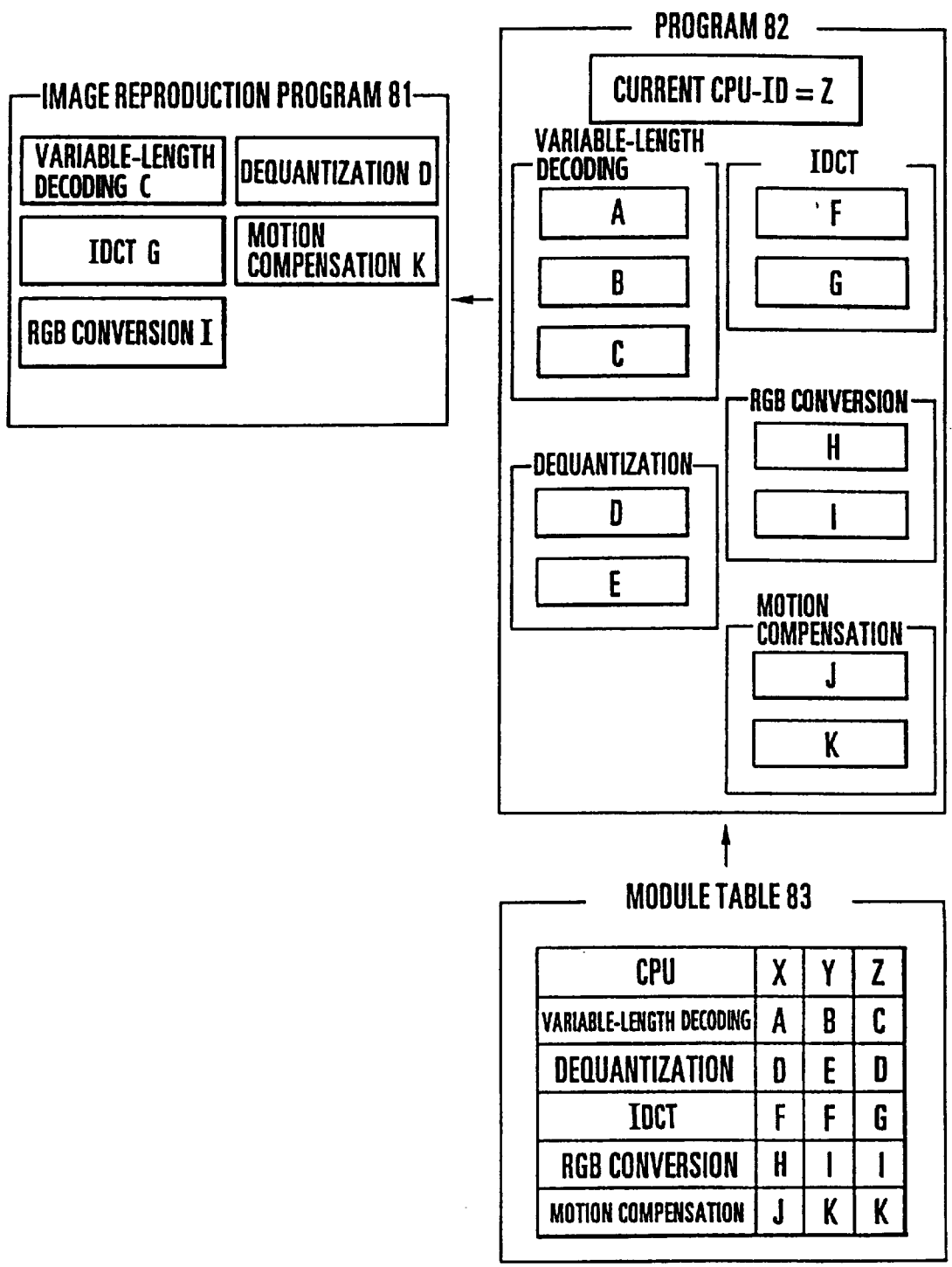
FIG. 6 is a view showing the flow of data in generating an optimal program in the present invention.

FIG. 6 shows the flow of data in generating an optimal program. Referring to FIG. 6, when the performance of a CPU is Z (to be referred to as CPU "Z" hereinafter), a program 81 for image reproduction is optimized. First of all, the optimal variable-length decoding modulate for CPU "Z" is obtained from a module table 83. Since the optimal variable-length decoding module for CPU "Z" is variable-length decoding "C", variable-length decoding "C" is loaded from a program 82 into the image reproduction program 81. Subsequently, modules for dequantization "D", IDCT "G", motion compensation "K", and RGB conversion "I" are loaded in the same manner to generate the optimal image reproduction program for CPU "Z".

The program 82 is constituted by the modules that demand heavy loads on the CPU in the program. Image reproduction requires modules for variable-length decoding, dequantization, IDCT, motion compensation, and RGB conversion.

When image compression is to be performed, modules for Y/C separating, motion search, motion prediction, DCT, quantization, variable-length encoding, dequantization, IDCT, and motion compensation are stored in the same manner as described above.

The operation of the apparatus of the above embodiment will be described next with reference to the accompanying drawings.

Figure 7:
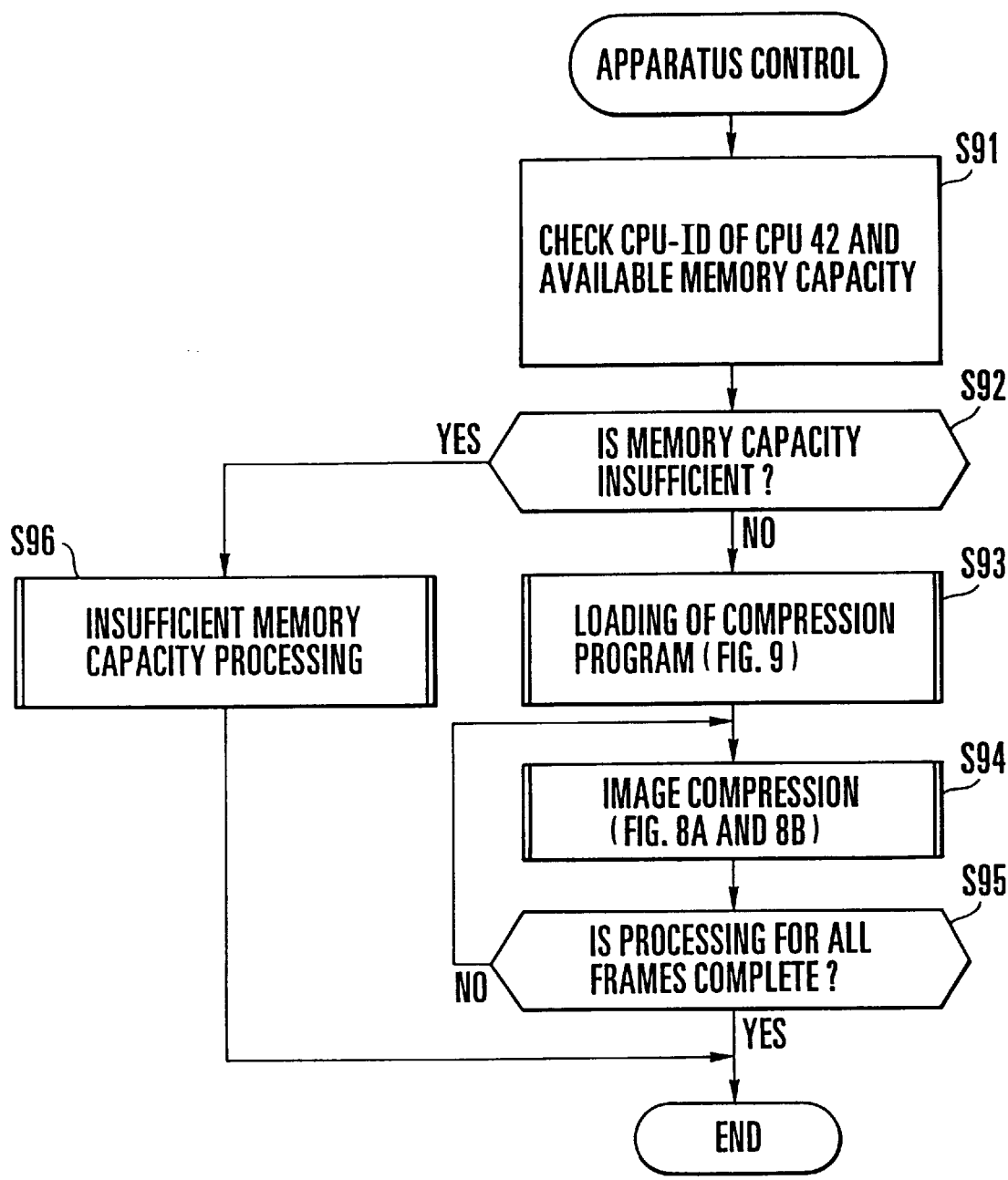
FIG. 7 is a flow chart for explaining the control operation of the apparatus control section of the image compressing apparatus in FIG. 4.

FIG. 7 shows the overall operation of the apparatus control section 41 of the image compression apparatus in FIG. 4. Referring to FIG. 7, first of all, the apparatus control section 41 checks the CPU-ID of the current CPU 42 and the available capacity of the memory 42a (step S91) to determine the optimal modules for image reproduction to be performed with the current performance. The apparatus control section 41 then checks whether the capacity of the memory 42a is insufficient for the optimal modules obtained as a result of the determination (step S92). If it is determined that the capacity of the memory 42a is insufficient, insufficient memory capacity processing is performed (step S96). If it is determined in step S92 that the memory capacity is sufficient, the optimal modules obtained as a result of the determination are loaded from the program 55 into the memory 42a to generate a compressed program (step S93). Image compression is then executed (step S94), and it is checked whether the processing for all the frames is complete (step S95). If the processing for all the frames is complete, the processing is terminated. If the processing is not complete, the flow returns to step S94.

Figure 8A:
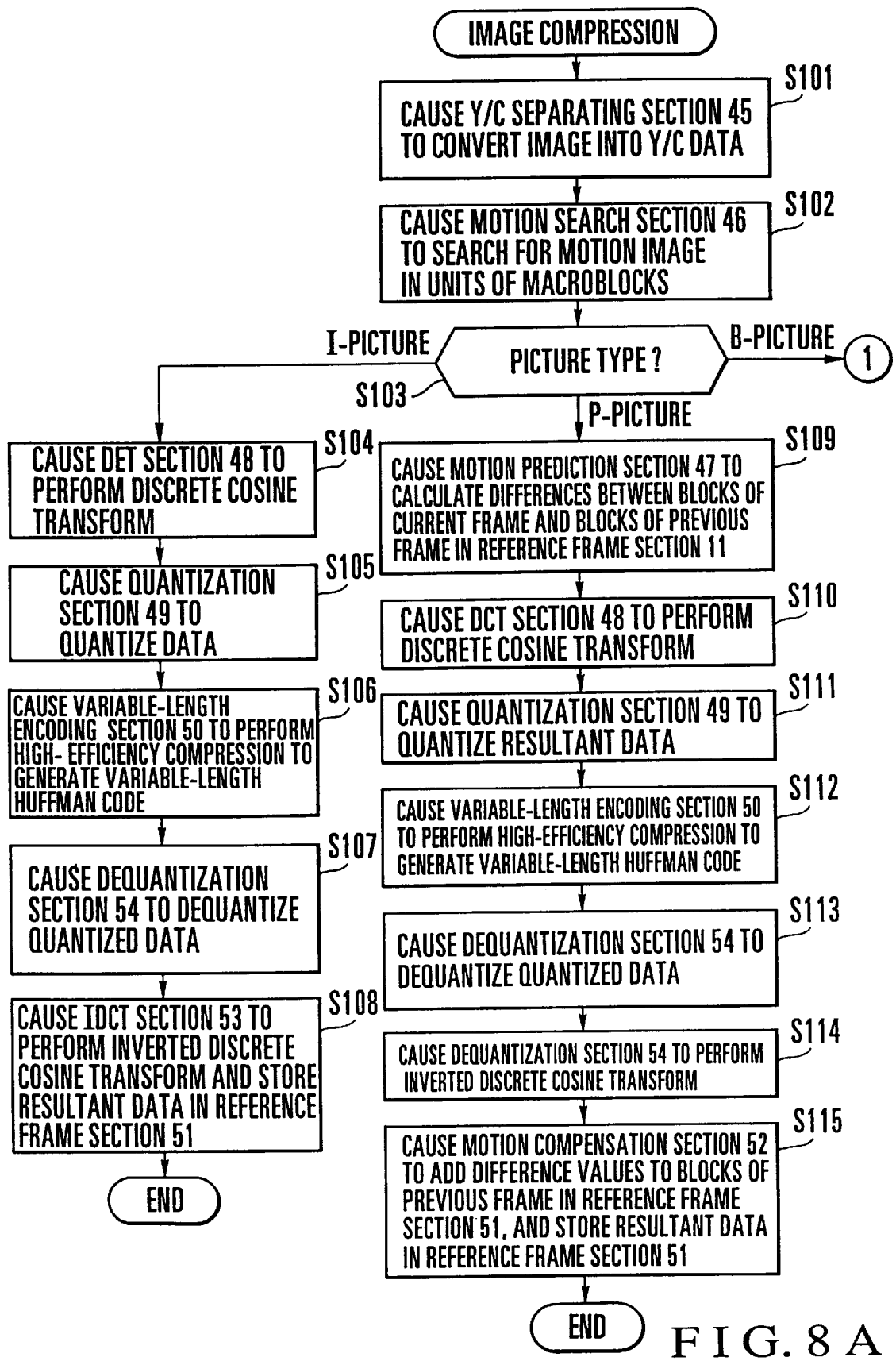
FIGS. 8A and 8B are flow charts for explaining the image compression processing in FIG. 7.
Figure 8:
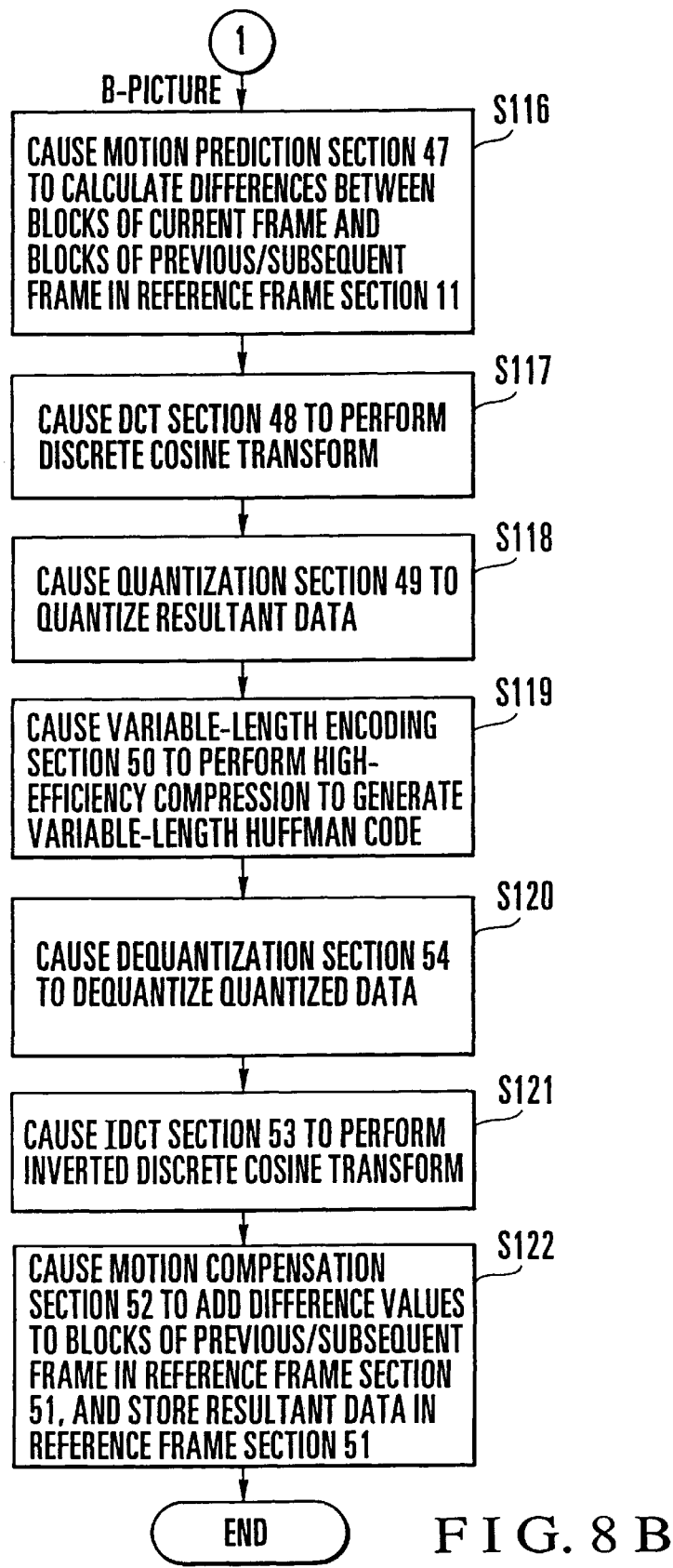

FIGS. 8A and 8B show the image compression processing in step S94 in FIG. 7. Referring to FIG. 8A, first of all, the Y/C separating section 45 converts an image into Y/C data (step S101). The motion search section 46 searches for the motion of the image in units of macroblocks (step S102). The apparatus control section 41 then determines the types of pictures, and processes the image data in units of picture types.

When an I-picture is determined in step S103, the DCT section 48 performs discrete cosine transform (step S104), and the quantization section 49 quantizes the resultant data (step S105). The variable-length encoding section 50 performs high-efficiency compression for the quantized data to generate a variable-length Huffman code (step S106). The dequantization section 54 dequantizes the quantized data (step S107). The IDCT section 53 performs inverted discrete cosine transform for the dequantized data and stores the resultant data in the reference frame section 51 (step S108). Thereafter, the processing is terminated.

When a P-picture is determined in step S103, the motion prediction section 47 calculates the differences between blocks of the current frame and blocks in the previous frame in the reference frame section 51 (step S109). The DCT section 48 performs discrete cosine transform (step S110). The quantization section 49 quantizes the resultant data (step S111). The variable-length encoding section 50 performs high-efficiency compression for the quantized data to generate a variable-length Huffman code (step S112). The motion compensation section 52 dequantizes the quantized data (step S113). The IDCT section 53 performs inverted discrete cosine transform for the dequantized data (step S114). The motion compensation section 52 then adds the difference values to the blocks of the previous frame in the reference frame section 51, and stores the resultant data in the reference frame section 51 (step S115). Thereafter, the processing is terminated.

When a B-picture is determined in step S103, as shown in FIG. 8B, the motion prediction section 47 calculates the differences between blocks of the current frame and blocks of the previous/subsequent frame in the reference frame section 51 (step S116). The DCT section 48 performs discrete cosine transform (step S117). The quantization section 49 quantizes the resultant data (step S118). The variable-length encoding section 50 performs high-efficiency compression for the quantized data to generate a variable-length Huffman code (step S119). The dequantization section 54 dequantizes the quantized data (step S120). The IDCT section 53 performs inverted discrete cosine transform for the dequantized data (step 121). The motion compensation section 52 then adds the difference values to the blocks of the previous/subsequent frame in the reference frame section 51, and stores the resultant data in the reference frame section 51 (step S122). Thereafter, the processing is terminated.

FIG. 9 shows the procedure for generating a compression program in step S93 in FIG. 7. The compression program is sequentially loaded into the memory 42a in processing units. Referring to FIG. 9, a module is loaded with the current CPU-ID and "Y/C separating" as arguments (step S131). A module is loaded with the current CPU-ID and "motion search" as arguments (step S132). A module is loaded with the current CPU-ID and "motion prediction" as arguments (step S133). A load is loaded with the current CPU-ID and "DCT" as arguments (step S134). A module is loaded with the current CPU-ID and "quantization" as arguments (step S135). A module is loaded with the current CPU-ID and "variable-length encoding" as arguments (step S136). A module is loaded with the current CPU-ID and "dequantization" as arguments (step S137). A module is loaded with the current CPU-ID and "IDCT" as arguments (step S138). A module is loaded with the current CPU-ID and "motion compensation" as arguments (step S139). The processing is then terminated.

Figure 10A:
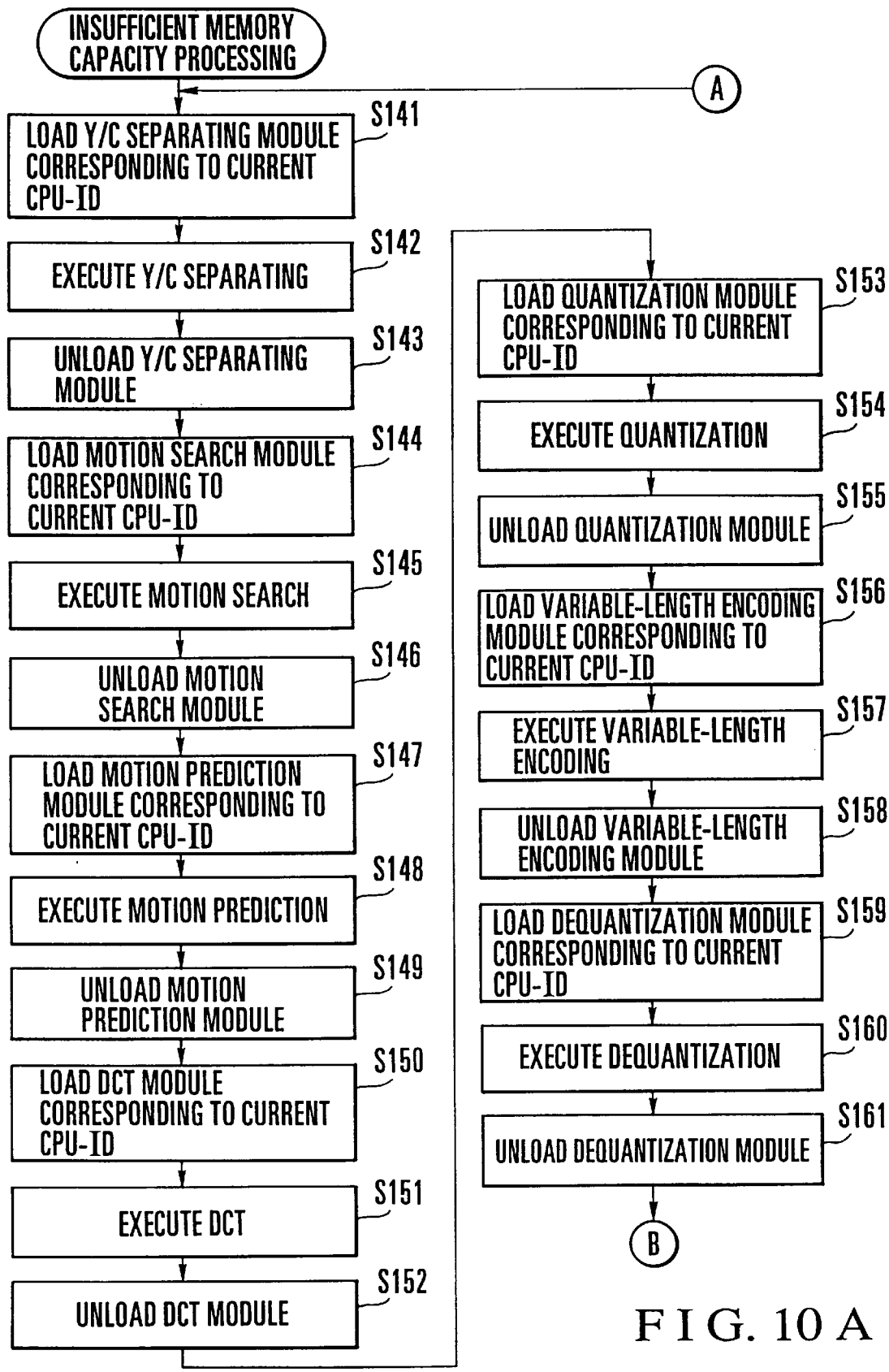
FIGS. 10A and 10B are flow charts for explaining the processing to be performed when the memory capacity is insufficient in FIG. 7.
Figure 10B:
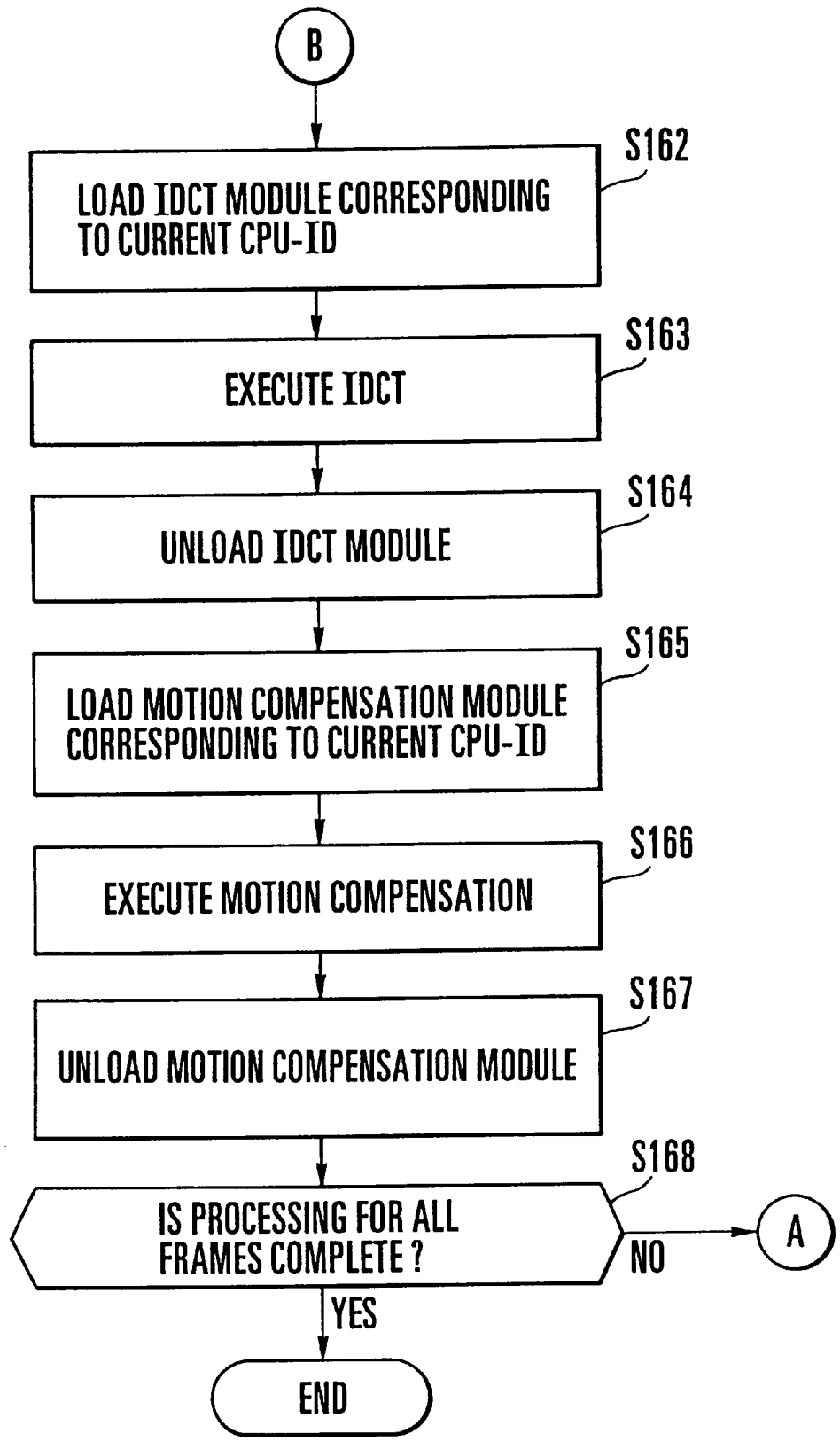

FIGS. 10A to 10B show the processing in step S96 in FIG. 7 which is to be performed when the memory capacity is insufficient. -Referring to FIG. 10A, a module is loaded with the current CPU-ID and "Y/C separating" as arguments (step S141). Y/C separating is executed (step S142). The memory areas for the data and the program which have been used for the Y/C separating are released (step S143). A module is loaded with the current CPU-ID and "motion search" as arguments (step S144). Motion search is executed (step S145). The memory areas for the data and the program which have been used for the motion search are then released (step S146). A module is loaded with the current CPU-ID and "motion prediction" as arguments (step S147). Motion prediction is executed (step S148). The memory areas for the data and the program which have been used for the motion prediction are then released (step S149). A module is loaded with the current CPU-ID and "DCT" as arguments (step S150). DCT is executed (step S151). The memory areas for the data and the program which have been used for DCT are then released (step S152). A module is loaded with the current CPU-ID and "quantization" as arguments (step S153). Quantization is executed (step S154). The memory areas for the data and the program which have been used for the quantization are then released (step S155). A module is loaded with the current CPU-ID and "variable-length encoding" as arguments (step S156). Variable-length encoding is executed (step S157). The memory areas for the data and the program which have been used for the variable-length encoding are then released (step S158). A module is loaded with the current CPU-ID and "dequantization" as arguments (step S159). Dequantization is executed (step S160). The memory areas for the data and the program which have been used for the dequantization are then released (step S161). As shown in FIG. 10B, a module is loaded with the current CPU-ID and "IDCT" as arguments (step S162). IDCT is executed (step S163). The memory areas, for the data and the program which have been used for IDCT are then released (step S164). A module is loaded with the current CPU-ID and "motion compensation" as arguments (step S165). Motion compensation is executed (step S166). The memory areas for the data and the program which have been used for the motion compensation are then released (step S167). It is checked whether all the frames have been processed (step S168). If NO in step S168, the flow returns to step S141.

FIG. 11 shows the processing performed by the apparatus control section 61 of the image reproducing apparatus in FIG. 5. Referring to FIG. 11, as in the processing shown in FIG. 7, first of all, the apparatus control section 61 checks the CPU-ID of the current CPU 62 and the capacity of the available memory 62a (step S171). The optimal modules for image reproduction to be performed with the current performance are determined. The apparatus control section 61 checks whether the capacity of the memory 62a is insufficient for the optimal modules obtained as a result of the determination (step S172). If it is determined that the capacity of the memory 62a is insufficient, insufficient memory capacity processing is performed (step S176). If it is determined in step S172 that the capacity of the memory 62a is sufficient, the optimal modules obtained as a result of determination are loaded from the program 71 into the memory 62a to generate a reproduction program (step S173). Image reproduction is executed (step S174), and it is checked whether the processing for all the frames is complete (step S175). If the processing for all the frames is complete, the processing is terminated. If it is determined that the processing for all the frames is not complete, the flow returns to step S714.

Figure 12:
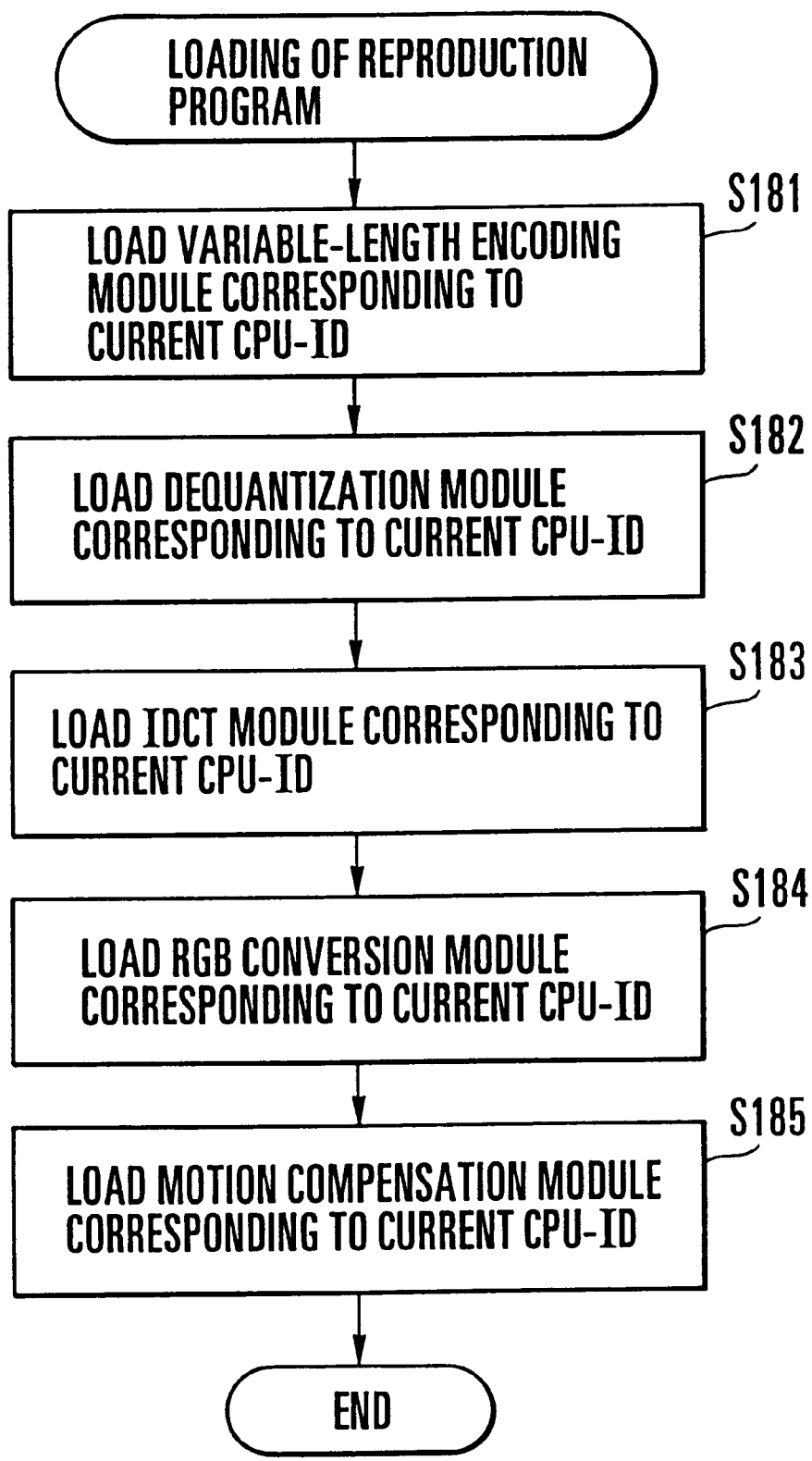
FIG. 12 is a flow chart for explaining the reproduction program generation processing in FIG. 11.

FIG. 12 shows the procedure for generating a reproduction program in step S173 in FIG. 11. The reproduction program is sequentially loaded into the memory 62a in processing units. Referring to FIG. 12, a module is loaded with the current CPU-ID and "variable-length decoding" as arguments (step S181). A module is loaded with the current CPU-ID and "dequantization" as arguments (step S182). A module is loaded with the current CPU-ID and "IDCT" as arguments (step S183). A module is loaded with the current CPU-ID and "RGB conversion" as arguments (step S184). A module is loaded with the current CPU-ID and "motion compensation" as arguments (step S185). The processing is then terminated.

Figure 13:
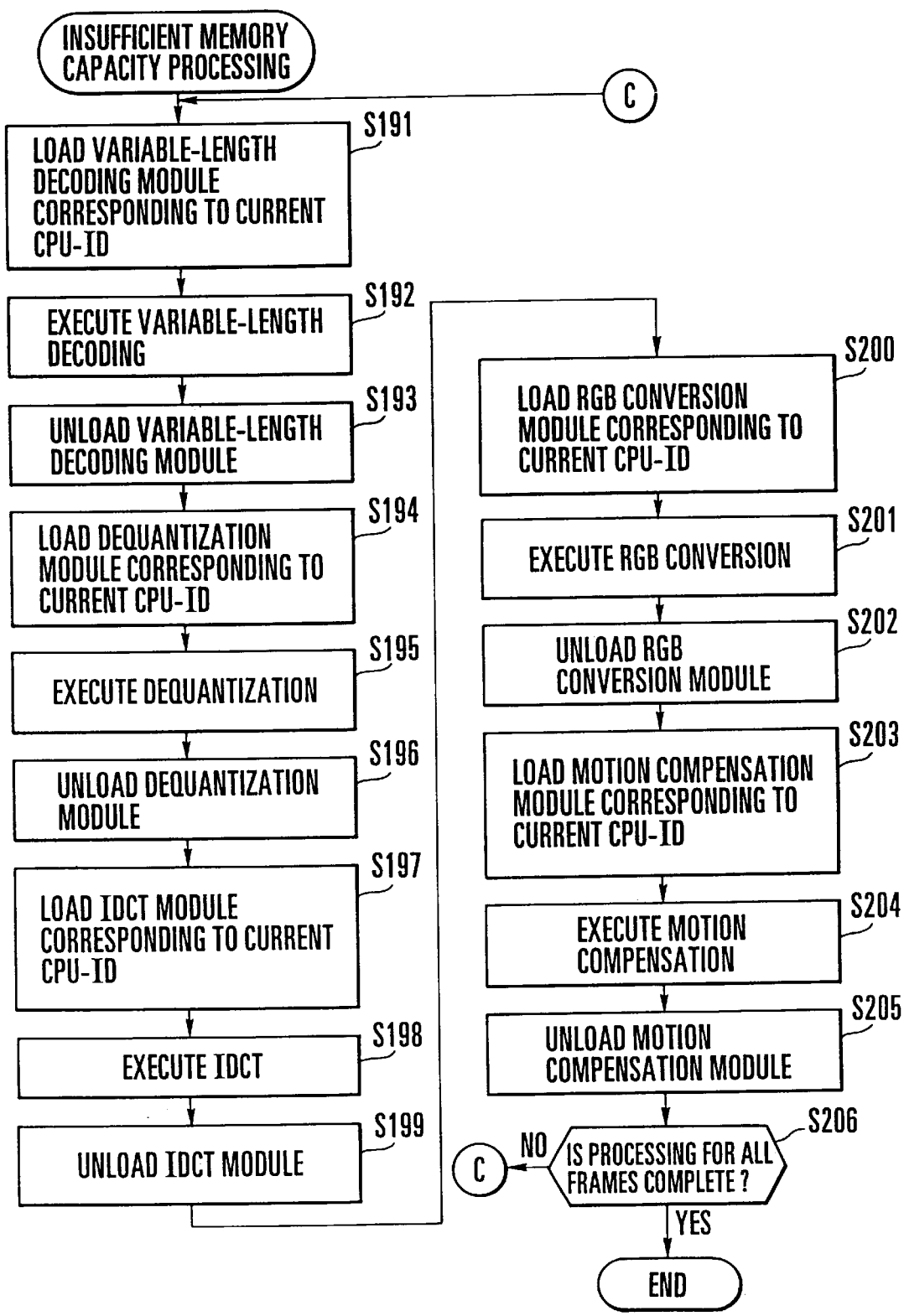
FIG. 13 is a flow chart for explaining the processing to be performed when the memory capacity is insufficient in FIG. 11.

FIG. 13 shows the insufficient memory capacity processing in step S176 in FIG. 11. Referring to FIG. 13, a module is loaded with the current CPU-ID and "variable-length decoding" as arguments (step S191). Variable-length decoding is executed (step S192). The memory areas for the data and the program which have been used for the variable-length decoding are then released (step S193). A module is loaded with the current CPU-ID and "dequantization" as arguments (step S194). Dequantization is executed (step S195). The memory areas for the data and the program which have been used for the dequantization are then released (step S196). A module is loaded with the current CPU-ID and "IDCT" as arguments (step S197). IDCT is executed (step S198). The memory areas for the data and the program which have been used for IDCT are then released (step S199). A module is loaded with the current CPU-ID and "RGB conversion" as arguments (step S200). RGB conversion is executed (step S201). The memory areas for the data and the program which have been used for the RGB conversion are then released (step S202). A module is loaded with the current CPU-ID and "motion compensation" as arguments (step S203). Motion compensation is executed (step S204). The memory areas for the data and the program which have been used for the motion compensation are then released (step S205). Thereafter, it is checked whether the processing for all the frames is complete (step S206). If the processing for all the frames is complete, the processing is terminated. If the processing for all the frames is not complete, the flow returns to step S191.

FIG. 14 shows the image reproduction processing in step S174 in FIG. 11. Referring to FIG. 14, the variable-length decoding section 65 decodes a compressed code (step S211), and a picture type is determined (step S212) to perform processing corresponding to the determined picture type.

If an I-picture is determined in step S212, the dequantization section 66 dequantizes the image data (step S213). The IDCT section 67 performs inverted discrete cosine transform for the dequantized data, and stores the resultant data in the reference frame section 69 (step S214). The RGB conversion section 68 converts the Y/C data into RGB data (step S215). The processing is then terminated.

If a P-picture is determined in step S212, the dequantization section 66 dequantizes the image data (step S216). The IDCT section 67 performs inverted discrete cosine transform for the dequantized data (step S217). The motion compensation section 70 adds the difference values between blocks of the current frame and blocks of the previous frame in the reference frame section 69 to the output from the IDCT section 67 (step S218), and stores the resultant data in the reference frame section 69 (step S218). The RGB conversion section 68 converts the Y/C data into RGB data (step S219). The processing is then terminated.

If a B-picture is determined in step S212, the dequantization section 66 dequantizes the image data (step S220). The IDCT section 67 performs inverted discrete cosine transform for the dequantized data (step S221). The motion compensation section 70 adds the difference values between blocks of the current frame and blocks of the previous/subsequent frame in the reference frame section 69 to the output from the IDCT section 67, and stores the resultant data in the reference frame section 69 (step S222). The RGB conversion section 68 converts the Y/C data into RGB data (step S223). The processing is then terminated.

When a predetermined processing speed is required for a compression program as in a case in which video conference image data is compressed, an optimal compression program must be generated by loading the optimal modules for the CPU to be used so as to meet the speed standards required for a plurality of CPUs with different processing speeds. Table 1 shows an example of the module table of optimal modules to be loaded. Of the modules constituting a compression program, DCT, quantization, and variable-length encoding modules are shown in Table 1. In this case, the modules to be loaded are classified in consideration of only the processing speeds of CPUS.

as is obvious from the comparison between FIGS. 15A and 15B, the number of instructions in the program for the 16-bit CPU for the same arithmetic operation becomes larger than that for the 32-bit CPU. Furthermore, in the 16-bit CPU, the program for the 32-bit CPU does not work, and hence only the program for the 16-bit CPU can be selected. To switch the modules to be loaded according to the types of CPUS, the CPU-ID which is the value unique to each CPU is checked, and the optimal modules for the currently used CPU are loaded.

Figures 16, 17A, 17B:
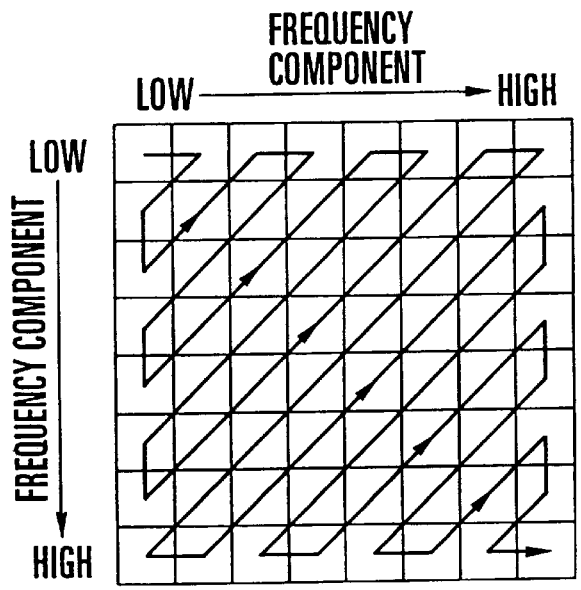
FIG. 16 is a view showing the scanning order of the pixels in 8×8 blocks in the present invention.
FIGS. 17A and 17B are views showing an example of truncation processing in a quantization program module.

The truncation processing to be performed by the quantization module used when the processing speed of the CPU is low will be described next. FIG. 16 shows 8×8 blocks. After DCT processing, the blocks are converted into frequency components, and arranged in the order like that shown in FIG. 16 from the lowest frequency component to the highest frequency component. In standard quantization processing, multiplication/division must be performed for all the 64 components. As the frequency increases, the probability that the frequency component after quantization becomes 0 increases. In addition, even if high-frequency components are omitted, the resultant difference is not easily recognized visually. For this reason, when quantization is to be performed from the lowest frequency component to the highest frequency component, the processing can be stopped at some midpoint in the process without performing the processing at all the 64 points so as to shorten the processing time. When the processing is stopped, Os are assigned to all

TABLE 1

| Processing Speed of | 16 bits | | | 32 bits | | |
|---|---|---|---|---|---|---|
| CPU | low speed | standard | high speed | low speed | standard | high speed |
| DCT | standard | standard | high quality | standard | standard | high quality |
| Quantization | truncation | standard | high quality | truncation | standard | high quality |
| Variable-length Encoding | truncation | standard | standard | truncation | standard | standard |

In Table 1, the modules roughly fall into two categories according to 16- and 32-bit CPUS. In each category, the processing speeds of the CPUs are classified into three types of speeds, i.e., "standard", "low", and "high", depending on whether the processing speeds fall within the range of standard speeds set in the compression program, lower than the standard speeds, or higher than the standard speeds.

The quantization module required for a 16-bit CPU will be described. If the processing speed of the CPU is low, a quantization module for truncation processing is loaded. If the processing speed is high, a quantization module for high-image-quality processing is loaded. If the processing speed falls within the standard speed range, a standard module which performs no special processing is loaded.

Similarly, DCT and variable-length encoding modules are selected and loaded according to the processing speed of the CPU. If the CPU is a 32-bit CPU, as in the case of the 16-bit CPU, the modules generated for the 32-bit CPU are selected and loaded. If, for example, the CPU is a 32-bit CPU and the processing speed is high, a "high image quality" module for DCT, a "high image quality" module for quantization, and a "standard" module for variable-length encoding are loaded.

FIGS. 15A and 15B show part of the quantization modules for the 16- and 32-bit CPUS. Assume that a program for a 16-bit CPU is executed when a 32-bit CPU is used. In this case, the operation speed of the program generally become lower than that of a program for the 32-bit CPU. In addition, the portions after the stop point. The stop point can be arbitrarily changed in accordance with the processing speed of the CPU. If the quantization processing is stopped at the 32nd point, the processing is complete in the period of time ½ that required for quantization at 64 points.

High-image-quality processing performed by using a quantization module when the processing speed of the CPU is high will be described next. To improve the quality of an image, the calculation precision must be improved. FIGS. 17A and 17B show an example of this operation. FIGS. 17A and 17B each show a program for a calculation of (18 ÷5)+(8÷3). When this calculation is performed to the first decimal place, 6.3 is obtained. According to the program shown in FIG. 17A, 18÷5=3 is obtained by division at the 0022nd line, and 8÷3=2 by division at 0026th line. The sum of these quotients is 5. According to the program for a high-precision calculation in FIG. 17B, the operands at the 0022nd and 0027th lines are multiplied by 16, and the result obtained by all the calculations is divided by 16. In this program, 18×16 ÷5=57 is obtained by division at 0023rd line, and 8×16÷3=42 is obtained by division at 0028th line. Since the sum of these quotients is divided by 16 at the 0030th line, (57+42) ÷16=6 is obtained. As is obvious from the comparison between the above results, the error in the high-precision calculation is smaller than that in the calculation in FIG. 17A because the ratio of the number of chopped digit positions to the right of the decimal point to the total number of digit positions is smaller than that in the calculation in FIG. 17A. In this high-precision calculation, however, since the operands are multiplied when they are divided, and the sum of the quotients is divided again, the operation amount is larger than that in the case in FIG. 17A. Since the processing time is prolonged as the image quality is improved by improving the calculation precision in this manner, this module is loaded as a module for a CPU with a high processing speed.

Figure 18:
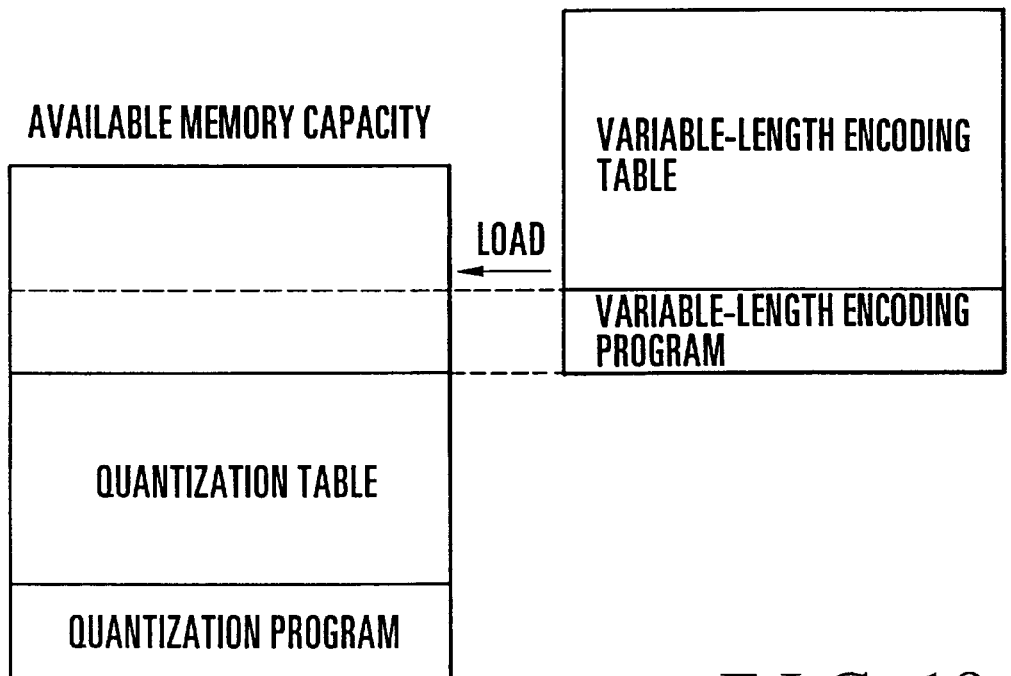
FIG. 18 is a view showing an example of the map of the program loaded into the memory.
Figure 19:
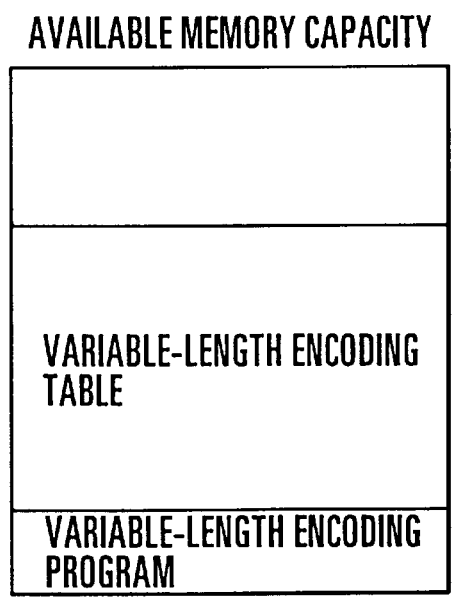
FIG. 19 is a view showing an example of the map of the program loaded into the memory.

To run a program when the available capacity of the memory is small, the amount of program and data to be loaded at once must be decreased. FIG. 18 shows a case in which variable-length encoding is performed after quantization. If, for example, a data table for quantization requires 4 bytes per point, and two 64-point tables are used, a total of 992 bytes are required. Assume that variable-length encoding is to be performed while this table is kept loaded in the memory. In this case, the encoding table may not be loaded because of a memory capacity shortage. In such a case, as shown in FIG. 19, before the variable-length encoding module is loaded into the memory, the available capacity of the memory must be increased by releasing the area used for the quantization module. By repeating this operation every time a module is loaded, the compression program can run with a small memory capacity.

By performing similar processing for Y/C separating, motion compensation, motion prediction, DCT, variable-length encoding, dequantization, and IDCT, optimal modules can be selected and operated in accordance with the performance of the CPU and the memory capacity.

As has been described above, according to the present invention, by preparing a plurality of modules constituting compression/reproduction modules, the optimal programs for the performance of the CPU to be used can be operated.

Even a program which cannot be entirely loaded into the memory because of a memory capacity shortage can be operated by sequentially loading the program into the memory in units of modules while unloading each module after use.

What is claimed is:

1. An image processing apparatus comprising:

an image processor, constituted by a given CPU from among a plurality of types of CPUs including a DSP, for compressing/encoding an image by using an intraframe code obtained by dividing an image into small blocks, performing orthogonal transform for each block in accordance with one of a first plurality of program modules, quantizing the transform result in accordance with one of a second plurality of program modules, and performing high-efficiency encoding the quantized result in accordance with one of a third plurality of program modules, and performing motion search by searching for blocks of previous and subsequent frames such that differences between the blocks and divided blocks of a current frame become minimium, calculating the differences between the blocks of the current frame and the blocks of the frames having undergone the motion search, performing orthogonal transform for the difference blocks, quantizing the transform result, and performing high-efficiency encoding for the quantized result;

a module table for designating each modular program of said first, second and third plurality of program modules required to constitute an image processing program as optimally corresponding to one of said plurality of types of CPUs;

a module storage device for storing said plurality of first, second and third program modules designated by said module table; and a program generator for generating an optimal image processing program for said given CPU in use by loading designated modules from said module storage device with reference to said module table thereby selecting optimal program modules from among said first, second and third plurality of program modules, each selected in accordance with the type of said given CPU.

2. An apparatus according to claim 1, further comprising a memory into which the optimal image processing program is loaded, and wherein said given CPU performs image processing in accordance with the image processing program loaded into said memory.

3. An apparatus according to claim 2, wherein said program generator repeats an operation of loading a module into said memory in processing units, and unloading the module from said memory after execution thereof when a capacity of said memory is insufficient.

4. An apparatus according to claim 1, wherein said image processor comprises an image reproducing section for performing image reproduction processing in accordance with an image reproduction program.

5. An image processing apparatus comprising:

image processing means, constituted by a given CPU from among a plurality of types of CPUs including a DSP, for performing image processing constituted by a plurality of processing units executing an optimally selected plurality of program modules;

a module table for designating each of a plurality of program modules required to constitute an image processing program as optimally corresponding to one of said plurality of types of CPUs;

a module storage device for storing said plurality of program modules designated by said module table; and a program generator for selecting and generating an optimal image processing program for said given CPU in use by loading designated modules from said module storage device with reference to said module table thereby selecting and generating said optimally selected plurality of program modules from among said plurality of program modules, each selected in accordance with said type of said given CPU.

* * * * *